United States Patent [19]

Castoe

[11] 3,877,318

[45] Apr. 15, 1975

[54] REMOTE CONTROL FOR AUTOMOBILE ACCELERATOR AND BRAKE PEDALS

[76] Inventor: John H. Castoe, 10234 McVine St., Sunland, Calif. 91040

[22] Filed: Apr. 11, 1973

[21] Appl. No.: 350,071

[52] U.S. Cl.................................. 74/481; 74/482
[51] Int. Cl............................................ G05g 11/00
[58] Field of Search.......... 74/481, 482, 480 R, 532; 192/3 R

[56] References Cited
UNITED STATES PATENTS
| | | | |
|---|---|---|---|
| 2,964,965 | 12/1960 | Hanson | 74/481 |
| 3,129,604 | 4/1964 | Hanson | 74/482 |
| 3,749,212 | 7/1973 | Black | 74/482 X |

*Primary Examiner*—Samuel Scott
*Assistant Examiner*—F. D. Shoemaker
*Attorney, Agent, or Firm*—Christie, Parker & Hale

[57] ABSTRACT

A remote controlled actuating device for operating either the accelerator pedal or brake pedal of an automobile includes a pair of slidable piston rods spaced so they can engage the pedals. The piston rods are disposed in corresponding cylinders connected to a support frame which includes a spring-loaded support member engaged with the automobile floorboard and biasing the support frame into engagement with the front seat of the automobile to hold the piston rods in alignment with the pedals. The piston rods are operated by a remote control system for selectively operating either piston rod to depress either pedal while concurrently retracting the other. A preferred use of the invention is for balancing the rear wheels of an automobile, where the mechanic adds weights to the rear wheel, remotely actuates the accelerator pedal to spin the wheel and test the balance of the wheel, and then remotely applies the brake to stop the wheel.

21 Claims, 8 Drawing Figures

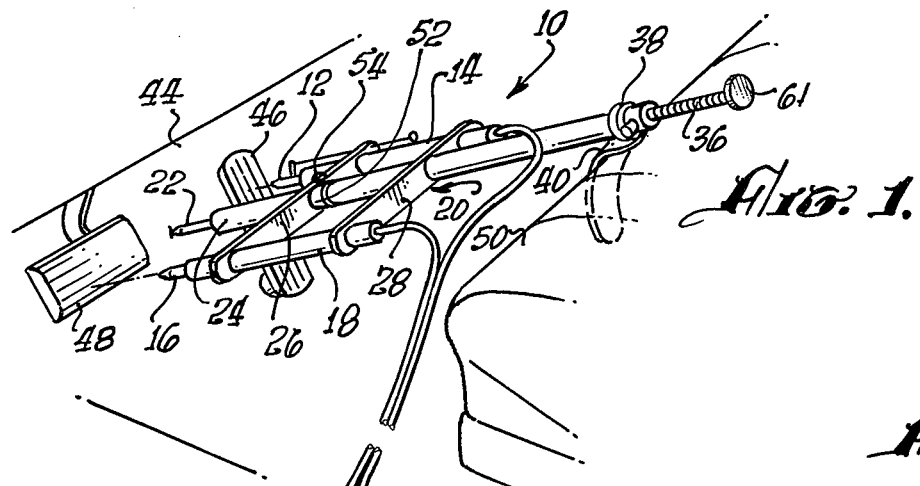
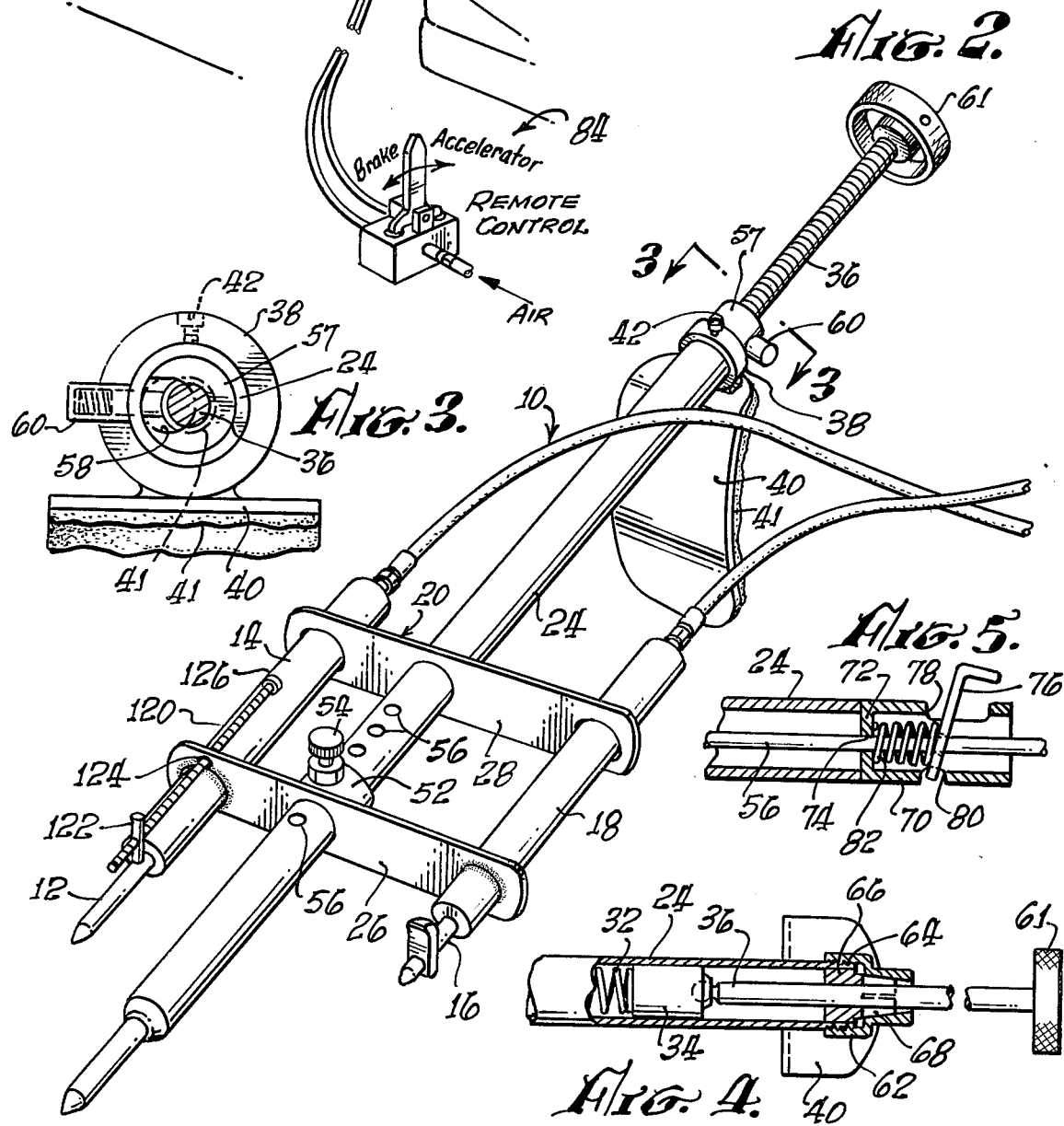

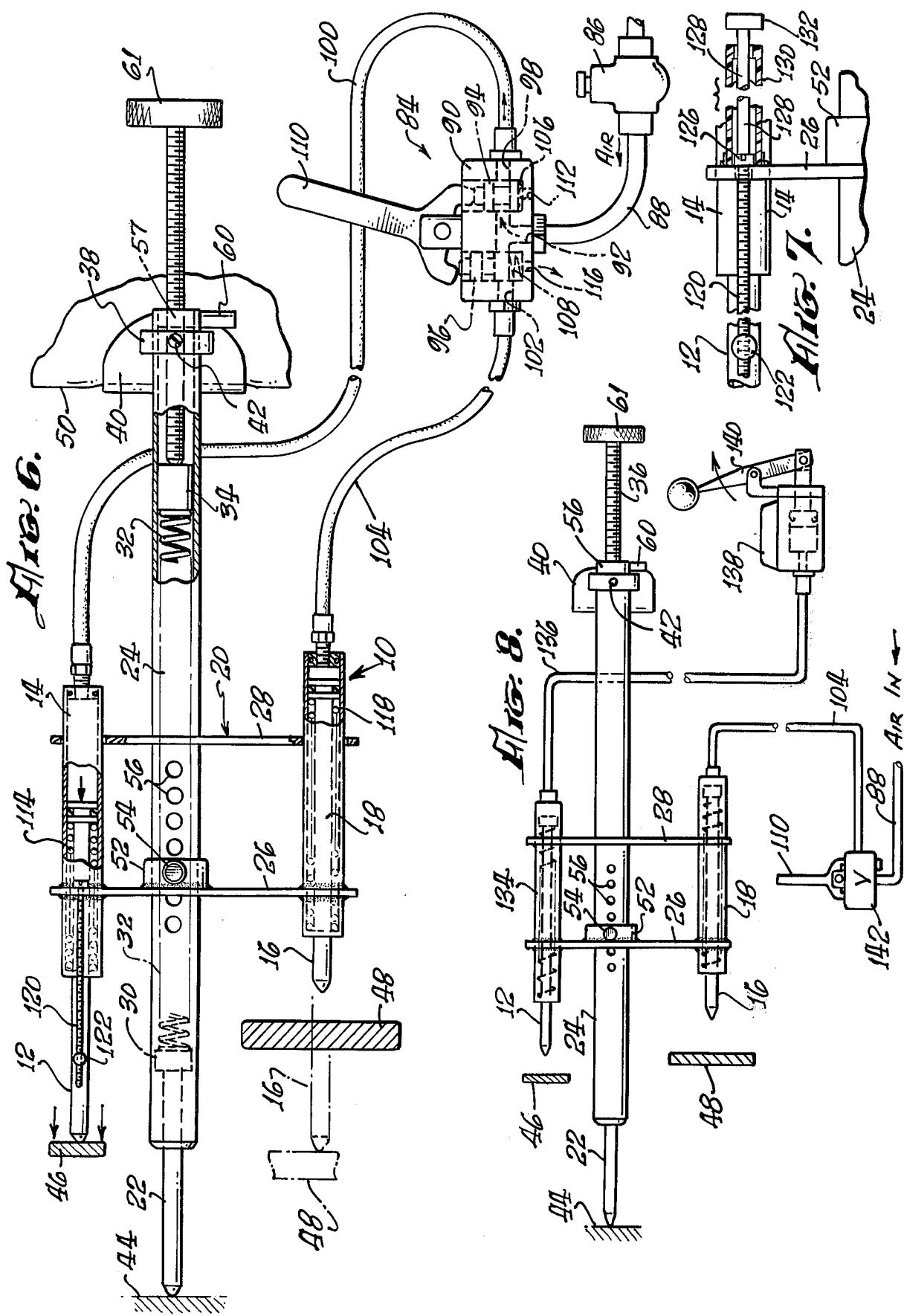

REMOTE CONTROL FOR AUTOMOBILE ACCELERATOR AND BRAKE PEDALS

BACKGROUND OF THE INVENTION

This invention relates to an actuating device which allows a mechanic working on an automobile to remotely control either the accelerator pedal or the brake pedal of the automobile.

There are many jobs where an automobile mechanic needs a "third hand" for depressing or releasing either the accelerator pedal or brake pedal of an automobile. One example is where the mechanic dynamically balances the rear wheels of the automobile without the necessity of removing the wheels. The main purpose of this method is to save the time it normally takes to remove the wheels and mount each one on a conventional static or dyanmic balancing machine. The rear wheels can be balanced without removing them by jacking up the rear end of the automobile, adding weights to each wheel, actuating the accelerator pedal to spin the wheel at a high speed to test the balance of the wheel, and applying the brake to stop the wheel. Sometimes two mechanics are used for this job, one for testing the balance of the wheels, and the other providing the third hand to operate the accelerator and brake pedals. However, this usually adds to the labor cost of the job, and therefore does not provide much of a cost savings over the conventional wheel balancing procedures.

To solve this problem, special tools have been used to actuate the accelerator pedal so that only one mechanic need be used to balance the wheels. However, the time saved in leaving the wheels on the automobile often is lost, because the mechanic must spend a substantial amount of time going back and forth between testing the rear wheels and either applying or removing the tool which operates the accelerator pedal.

SUMMARY OF THE INVENTION

This invention provides a remote controlled actuating device for controlling operation of either the accelerator or brake pedal of an automobile. In a preferred application of the invention, a mechanic balancing the rear wheels of an automobile can operate the device to automatically spin the wheels and stop them while staying at the rear of the automobile to test the balance of the wheels. Thus, substantial time and labor costs are saved when compared with conventional wheel balancing methods.

Briefly, the actuating device includes an accelerator position control member to be engaged with the accelerator pedal and movable between an operative position in which it depresses the accelerator pedal and an inoperative position in which it releases the accelerator pedal. A support device maintains the accelerator control member in a position so it can engage the accelerator pedal. A control system remote from the accelerator control member moves the member between its operative and inoperative positions.

In a preferred form of the invention, the support device holds the accelerator control member in a fixed position between the floorboard of the automobile and a fixture in the automobile such as the front seat. Preferably, the support device is spring biased against the front seat and is thereby adjustable to fit automobiles of different sizes.

Preferably, the remote control device also includes a brake pedal position control member which is movable between an operative position in which it depresses the brake pedal and an inoperative position in which it releases the brake pedal. In this form of the invention, the support device holds both position control members in alignment with the accelerator and brake pedals, and the control system operates one control member or the other so that a mechanic located in a remote position can actuate either pedal and concurrently release the other.

These and other aspects of the invention will be more fully understood by referring to the following detailed description and the accompanying drawings.

BRIEF DESCRIPTION OF THE DRAWINGS

FIG. 1 is a fragmentary perspective view showing the remote controlled actuating device of this invention in use controlling operation of an accelerator pedal and brake pedal of an automobile;

FIG. 2 is an enlarged fragmentary perspective view of the actuating device;

FIG. 3 is a fragmentary cross-sectional elevation view taken on line 3—3 of FIG. 2;

FIG. 4 is a fragmentary cross-sectional elevation view, partly broken away, showing an alternate form of the means for adjusting the support which holds the actuating device in the automobile;

FIG. 5 is a fragmentary cross-sectional elevation view showing a further alternate form of the means for adjusting the support which holds the actuating device;

FIG 6 is a fragmentary plan view, partly broken away, showing the actuating device in use in the automobile;

FIG. 7 is a fragmentary cross-sectional elevation view showing an adjustable stop for limiting travel of the accelerator position control device; and FIG. 8 is a fragmentary schematic plan view showing an alternate remote controlled actuating device.

DETAILED DESCRIPTION OF THE PREFERRED EMBODIMENTS

Referring to FIGS. 1 and 2, a remote controlled accelerator and brake pedal actuating device 10 includes an elongated accelerator control piston rod 12 slidably disposed in a cylinder 14, and a separate elongated brake control piston rod 16 slidably disposed in a cylinder 18 spaced laterally from and extending parallel to cylinder 14.

A rigid support frame 20 holds both cylinders in a fixed position relative to each other. The support frame includes an enlongated movable support adjusting rod 22 protruding from what will be referred to as the bottom end of an elongated tube 24, the tube being disposed between and extending parallel to cylinders 14 and 18. A pair of longitudinally spaced apart transverse cross-braces 26 and 28 are loosely fitted around tube 24 and rididly secured to cylinders 14 and 18 to hold the tube and cylinders in their fixed parallel relation.

The operation of support adjusting rod 22 is understood best by referring to FIGS. 2, 3 and 5. Rod 22 has a head 30 which makes a close sliding fit in the interior of tube 22. Head 30 is engaged by one end of an elongated coil spring 32 which occupies a major portion of the length of the tube interior. The other end of the coil spring engages one end of a cylindrical spool 34 which makes a close sliding fit in the tube interior. An elongated threaded rod 36 engages the opposite end of the spool and extends outwardly from the top end of tube 24.

A longitudinally slidable collar 38 is disposed around the exterior of tube 24 adjacent the top end of the tube. The collar carries a downwardly projecting and arcuately curved support bracket 40 shaped to conform to the contour of the front edge of an automobile seat as described in detail below. A layer 41 of deformable material, such as polyurethane foam, covers the front face of the bracket which faces toward the top end of the tube. Collar 38 is releasably fixed to tube 24 by a set screw 42. Loosening of the set screw allows the position of collar 38 and bracket 40 to be adjusted relative to tube 24.

Use of accelerator and brake actuating device 10 is illustrated best in FIG. 1 which shows the device in place in the front seat area of an automobile. Support adjusting rod 22 is placed against a portion of a floorboard 44 between an accelerator pedal 46 and a brake pedal 48 of the automobile. The spring-loaded adjusting rod 22 bears against the floorboard, with the tension produced by coil spring 32 biasing bracket 40 against a front seat 50 of the automobile to firmly hold adjusting device 10 in a fixed position. Cylinders 14 and 18 are held in a fixed laterally spaced apart position by the support frame so that piston rods 12 and 16 can be extended to engage accelerator pedal 46 and brake pedal 48, respectively. The system for controlling movement of the piston rods will be described in greater detail below.

Two adjustments are provided for support frame 20. An adjustment for the distance between floorboard 44 and pedals 46, 48 is provided by a collar 52 and an adjusting bolt 54. Collar 52 is rigidly secured to crossbrace 26 so it encircles the exterior of tube 24 which is free to slide longitudinally relative to the collar and cross-braces 26, 28. Several longitudinally spaced apart threaded holes 56 are provided in tube 24. Bolt 54 is threaded into a threaded hole in collar 52 and into an appropriate one of the holes 56 to provide the desired length adjustment to accommodate the distance between the floorboard and the pedals.

Rod 36 is movable in or out of tube 24 to adjust the desired tension in spring 32. FIGS. 2 and 3 show one means for adjusting the tension which includes an insert ring 57 rigidly fixed in the front end of tube 24, the ring having an internally threaded central opening engaging the threaded portion of rod 36 to hold the rod in a fixed position applying the desired tension to spring 32. A radially extending slot 58 is formed in one side of ring 57, and a spring-loaded plunger 60 extends through the slot to apply force to the side of rod 36 to hold it engaged with the threaded opening in ring 56. A knob 61 can be used to apply a sideways force to the rod against the bias of the plunger to disengage the rod from the threads in ring 56. This frees the rod from its fixed engagement and allows the rod to be moved longitudinally in tube 24 to adjust the spring tension on bracket 40.

FIG. 4 shows an alternate form of a tension adjustment which includes an internally threaded cap 62 engaged with an externally threaded end portion 64 of tube 24. A bushing 66 in the end of the tube holds rod 36 in a fixed axial position in the end of the tube. In this form of the adjusting means, rod 36 is not threaded. The bore through cap 62 tapers narrower toward the front end of the cap, and holds a tapered spring jam washer 68. The jam washer is slotted to allow lateral movement of rod 56 to free the rod for longitudinal movement to adjust the tension in spring 32. After the position of the rod is set, cap 62 can be tightened by threading it down on the end of tube 24 to squeeze jam washer 68 against the rod to hold the rod fixed in its desired position.

FIG. 5 shows a further alternate form of the tension adjustment, which includes a tubular fitting 70 having a facing 72 rigidly secured to the end of tube 24. Fitting 70 opens outwardly away from the end of the tube, and rod 36 slides longitudinally in the bore of fitting 70 and a bore 74 in facing 72. A long leg of an L-shaped adjustment bar 76 fits downwardly through a large slotted opening 78 in the top of the fitting and into a small slotted opening 80 in the opposite side of the fitting. Rod 36 extends through a close fitting bore in adjustment bars 76. A biasing spring 82 in fitting 70 is disposed concentrically around rod 36 and bears against facing 72 to apply spring tension to the long leg of adjustment bar 76 as shown in FIG. 5. The spring tension applied to adjustment bar 76 causes the long leg of the bar to pivot to a position askew from a truly upright position relative to the axis of the rod, thereby causing the bore in the adjustment bar to clamp against the rod and hold it in a fixed position in tube 24.

The longitudinal position of rod 36 in tube 24 can be adjusted by pushing the short leg of adjustment bar 76 against the bias of coil spring 82 (as represented by the arrow in FIG. 5) which releases bar 76 from its clamping engagement with rod 36 and frees the rod to allow it to be moved to its desired tension adjusting position.

Once cylinders 14 and 18 are held in their desired fixed positions by support frame 20, piston rods 12, 16 are ready to be actuated to depress or release either the accelerator pedal or the brake pedal. As described above, a preferred use of pedal actuating device 10 is in conjunction with the balancing of the rear wheels of the automobile, in which the mechanic depresses the accelerator pedal after weights have been added to the rear wheel to spin the wheel to test its balance. The accelerator pedal is then released and the brake pedal is depressed to stop the wheel to allow the mechanic to add more weights if desired.

Piston rods 12 and 16 are moved in and out of engagement with the accelerator and brake pedals, respectively, by a control system 84 located remotely from the pedals and illustrated best in FIGS. 1 and 6. The control system includes an air pressure regulator 86 connected to a supply of air under pressure. A hose 88 coupled to the regulator supplies air to a housing 90 which includes an air inlet port 92 for admitting air to either one of a pair of air valves 94 and 96. An air outlet port 98 from air valve 94 is connected to a hose 100 which is long enough to run from a location at the rear wheels of the automobile to air cylinder 14 which is fixed in the automobile front seat area in alignment with accelerator pedal 46. Similarly, an air outlet port 102 from air valve 96 is connected to a hose 104 which reaches to air cylinder 18.

Corresponding coil springs 106, 108 normally bias air valves 94, 96 closed so the valves normally block the passage of air through hoses 100, 104. The position of each air valve is controlled by a manually operated handle 110 attached to the top of housing 90. The handle normally is in a position which allows the bias of springs 106, 108 to urge valves 94, 96, respectively, into their closed positions.

In using control system 84, handle 110 is rotated to the right in FIG. 6 to close valve 94 and supply air to cylinder 14 to force piston rod 12 forward a sufficient distance that it depresses accelerator pedal 46 which in turn will spin the rear wheels of the automobile. Handle 110 then can be rotated to the left in FIG. 6 to close valve 96 and simultaneously open valve 94. This closes valve 96 to supply air to cylinder 18 to force piston rod 16 forward a sufficient distance that it depresses brake pedal 48 to stop the rear wheels, and simultaneously opens valve 94 to exhaust air through an exhaust port 112 and block the passage of air to cylinder 14 which retracts piston rod 12 under the bias of a coil spring 114, thereby releasing the accelerator pedal.

If the mechanic again desires to spin the rear wheels, handle 110 is rotated again to the right in FIG. 6 to close valve 94 and simultaneously open valve 96, which exhausts air through an exhaust port 116 and cuts off air from air cylinder 18 to retract piston rod 16 under the bias of a coil spring 118 to release the brake pedal, while simultaneously closing valve 94 to supply air to cylinder 14 to depress the accelerator pedal.

Thus, the rear wheels of the automobile can be balanced by a single mechanic who stays at the rear of the automobile and actuates the air control system to remotely control the accelerator and brake pedals to alternately spin the wheels and stop them while testing the balance of the wheels. There is no need for an extra mechanic to operate the pedals, or for a single mechanic to run back and forth between the rear wheels and the pedals when balancing the wheels. In practice, the remote controlled actuating device of this invention has made it possible to balance the rear wheels about 4 times faster than with conventional methods.

FIGS. 1, 2, and 6 show a stop attached to the outwardly projecting portion of piston rod 12 to limit the travel of the accelerator pedal when depressed by rod 12. The stop includes an elongated rigid rod 120 disposed above and extending parallel to air cylinder 14. Rod 120 is attached to a peg 122 carried on the outwardly projecting portion of piston rod 12. Rod 120 extends rearwardly through an opening 124 in cross-brace 26 to a point remote from the cross-brace. A stop nut 126 carried on the remote end of rod 120 engages cross-brace 26 during extension of piston rod 12 to limit further extension of the piston rod and thereby limit travel of the accelerator pedal.

Stop nut 126 can be fixed to rod 120 as shown in FIGS. 1, 2, and 6, or it can be adjustable as shown in FIG. 7. In the adjustable embodiment, rod 120 is threaded, and adjusting nut 126 is internally threaded so it can be rotated longitudinally back and forth relative to rod 120 to adjust its position on the rod. Preferably, the position of the stop nut is adjusted from a remote location at the rear wheels of the automobile by an elongated tubular adjusting rod 128 which is rigidly fixed to stop nut 126. Adjusting rod 128 is disposed in a sheath 130, or other suitable insulation, and extends to the area of the rear wheels where a handle 132 attached to the adjustment rod can be rotated in one direction or the other to change the position of the stop nut 126 relative to rod 120. By adjusting the position of the stop nut, the mechanic has the advantage of being able to adjust remotely the travel of accelerator pedal 46, and therefore the speed with which the rear wheels are rotated.

FIG. 8 shows an alternate form of the invention in which air cylinder 14 is replaced by a hydraulic cylinder 134 coupled to a hydraulic line 136 extending to a hydraulic valve unit 138 operated by a handle 140. Air cylinder 18 is shown being operated by a single air valve 142, although in a preferred form of the invention, hydraulic valve unit 138 and air valve 142 are in one unit controlled by one handle adapted to simultaneously extend piston rod 12 and retract piston rod 16, or vice versa. Obviously, this arrangement is for the purpose of avoiding applying the brake simultaneously with depressing the accelerator.

Hydraulic control is used for accelerator piston rod 12 instead of pneumatic control, because the hydraulically controlled piston will have a substantially slower rate of travel. This enables the mechanic to carefully control the distance which the accelerate pedal is depressed by piston rod 12 which, in turn, allows him to carefully control the speed at which the rear wheels are rotated. Thus, in this form of the invention no stop means for limiting travel of piston rod 12 is needed.

I claim:

1. A remote controlled actuating device for depressing or releasing the accelerator pedal and brake pedal of an automobile, the device including accelerator position control means to be engaged with the accelerator pedal and movable between an operative position in which it depresses the accelerator pedal and an inoperative position in which it releases the accelerator pedal, brake position control means to be engaged with the brake pedal and movable between an operative position in which it depresses the brake pedal and an inoperative position in which it releases the brake pedal, support means maintaining the accelerator position control means in a position for engagement with the accelerator pedal and also maintaining the brake position control means in a position for engagement with the brake pedal, and remote control means for moving the accelerator position control means and the brake pedal position control means between their operative and inoperative positions.

2. Apparatus according to claim 1 in which the automobile includes a floorboard and a fixture such as a seat spaced from the floorboard and the accelerator pedal, and in which the support means includes an elongated support arm to extend in a fixed position between the floorboard and the fixture.

3. Apparatus according to claim 2 in which the support means includes a support bracket coupled with the support arm, and spring biasing means engaged with the support arm and urging the support bracket into engagement with the fixture to hold the support arm in its fixed position.

4. Apparatus according to claim 1 in which the accelerator position control means includes a movable piston rod to be engaged with the accelerator pedal, and in which the remote control means includes means for extending and contracting the piston rod to depress and release the accelerator pedal, respectively.

5. Apparatus according to claim 4 in which the piston rod reciprocates in a fixed cylinder, and including means rigidly connecting the cylinder with the support means to hold the cylinder in a fixed position relative to the support means.

6. Apparatus according to claim 5 including stop means carried by the piston rod and engageable with the fixed support means to limit travel of the piston rod.

7. Apparatus according to claim 1 in which the accelerator position control means and the brake position control means include separate movable piston rods to be engaged with the accelerator pedal and brake pedal, respectively, and in which the remote control means includes means for extending and contracting both piston rods so each rod can either depress or release its corresponding pedal.

8. Apparatus according to claim 7 in which each piston rod reciprocates in a corresponding fixed cylinder, and including means rigidly interconnecting the cylinders with the support means to hold both cylinders in a fixed position relative to the support means.

9. Apparatus according to claim 7 in which the control means includes means for selectively actuating either the accelerator control piston rod or the brake control piston rod.

10. Apparatus according to claim 9 in which both piston rods are disposed in corresponding air operated cylinders, and in which the remote control means includes a remote positioned pneumatic control system for operating either air cylinder to extend either one piston rod or the other to its operative position, or to retract both piston rods into their inoperative positions.

11. Apparatus according to claim 9 including hydraulic control means for operating the accelerator piston, and pneumatic control means for operating the brake piston.

12. A remote controlled actuating device for depressing or releasing the accelerator pedal of an automobile having a floorboard and a seat spaced from the floorboard and the accelerator pedal, the actuating device including:

accelerator position control means to be engaged with the accelerator pedal and movable longitudinally between an operative position in which it depresses the accelerator pedal and an inoperative position in which it releases the accelerator pedal;

support means including an elongated support arm attached to the accelerator position control means and extending between the automobile seat and the floorboard for holding the control means in an operative position for engagement with the accelerator pedal, the support arm having an end portion thereof adapted for contact with the automobile floorboard when the control means is in its operative position, an elongated support bracket connected with the support arm at a location spaced from the end portion of the support arm, the support bracket being shaped to conform to the contour of the automobile seat, and spring-biasing means carried on the support arm for urging the support bracket into spring-biased engagement with the automobile seat when the end portion of the support arm is in contact with the automobile floorboard to hold the support arm in a fixed position between the automobile seat and the floorboard in which the control means is held in its operative position; and position adjusting means for varying the longitudinal distance between the support means point of contact with the floorboard and the accelerator position control means point of contact with the accelerator pedal.

13. Apparatus according to claim 12 including means for adjusting the position of the support bracket relative to the support arm.

14. Apparatus according to claim 12 including means engaged with the support arm for adjusting the spring tension in the spring-biasing means to adjust the spring force which with the support bracket is urged into contact with the automobile seat.

15. Apparatus according to claim 12 in which the accelerator position control means includes an elongated cylinder extending generally parallel to the support arm, a movable piston rod in the cylinder to be engaged with the accelerator pedal, and means for extending and contracting the piston rod to depress and release the accelerator pedal, respectively; and in which the position adjusting means includes means for varying the distance between the support means point of contact with the floorboard and the piston rod point of contact with the accelerator pedal.

16. Apparatus according to claim 15 in which the position adjusting means includes means for adjusting the longitudinal position of the support arm relative to the longitudinal position of the cylinder, and means for releasably maintaining the support arm in a fixed position relative to the cylinder.

17. Apparatus according to claim 16 in which the position adjusting means includes a laterally extending support member attached to the cylinder and movable with respect to the support arm, and means carried on the support member for adjustable attachment to the support arm to releasably hold the support arm in a fixed position relative to the cylinder.

18. Apparatus according to claim 17 in which the support arm includes a tubular member; and the spring-biasing means includes a movable position control member extending outwardly from the tubular body for contact with the floorboard, a biasing spring disposed in the interior of the tubular member for urging the position control member outwardly from the tubular body, and a tension control member extending into the interior of the tubular body and into engagement with the biasing spring for adjusting the tension in the spring.

19. Apparatus according to claim 12 in which the spring-biasing means extends outwardly from the end of the support arm for spring-biased contact with the floorboard.

20. Apparatus according to claim 12 in which the support arm includes a tubular member; and the spring-biasing means includes a movable position control member extending outwardly from the tubular body for contact with the floorboard, a biasing spring disposed in the interior of the tubular member for urging the position control member outwardly from the tubular body, and a tension control member extending into the interior of the tubular body and into engagement with the biasing spring for adjusting the tension in the spring.

21. Apparatus according to claim 12 in which the automobile includes a brake pedal, and including brake position control means to be engaged with the brake pedal and movable between an operative position in which it depresses the brake pedal and an inoperative position in which it releases the brake pedal, and in which the support means also maintains the brake position control means in a position for engagement with the brake pedal, and in which the control means also moves the brake pedal position control means between its operative and inoperative positions.

* * * * *